United States Patent
Von Kaldenberg et al.

(10) Patent No.: US 12,223,382 B2
(45) Date of Patent: Feb. 11, 2025

(54) IDENTIFICATION TAG, IDENTIFICATION TAG ACCESSORY, AND METHODS AND SYSTEMS FOR USING AN IDENTIFICATION TAG AND IDENTIFICATION TAG ACCESSORY

(71) Applicant: GOCHIP PET TECHNOLOGY INC., Vancouver (CA)

(72) Inventors: Alexander Von Kaldenberg, Vancouver (CA); Adam Turnbull, Kanata (CA); Patrick Ozenne, Les Avenières (FR); Cristina Llabres Llambias, Mahon (ES)

( * ) Notice: Subject to any disclaimer, the term of this patent is extended or adjusted under 35 U.S.C. 154(b) by 0 days.

(21) Appl. No.: 18/039,200

(22) PCT Filed: Nov. 29, 2021

(86) PCT No.: PCT/CA2021/051705
§ 371 (c)(1),
(2) Date: May 26, 2023

(87) PCT Pub. No.: WO2022/109752
PCT Pub. Date: Jun. 2, 2022

(65) Prior Publication Data
US 2024/0005110 A1    Jan. 4, 2024

Related U.S. Application Data

(60) Provisional application No. 63/118,783, filed on Nov. 27, 2020.

(51) Int. Cl.
*G06K 19/07* (2006.01)
*G06K 7/10* (2006.01)
*G06K 19/077* (2006.01)

(52) U.S. Cl.
CPC ... *G06K 7/10366* (2013.01); *G06K 19/07773* (2013.01)

(58) Field of Classification Search
CPC ......... G06K 7/10366; G06K 19/07773; G06K 19/07758; G06K 19/07767; G06K 19/0724; A01K 11/006
See application file for complete search history.

(56) References Cited

U.S. PATENT DOCUMENTS 7,277,889 B2 * 10/2007 Addonisio .............. G06F 16/21
7,450,010 B1 * 11/2008 Gravelle ............... H04L 9/3271
340/572.1
(Continued)

FOREIGN PATENT DOCUMENTS

CN           107148236 A      9/2017
WO    WO-2005001744 A2 *  1/2005  ......... G06K 19/0716
(Continued)

*Primary Examiner* — Tuyen K Vo
(74) *Attorney, Agent, or Firm* — McMillan LLP

(57) ABSTRACT

Disclosed herein is a tag suitable for use with pets and other animals. The tag may be a glass tag that includes an antenna, a first circuit block and a second circuit block. The antenna has a common core having a coil wound around the core. The coil interconnects a first antenna pad, a second antenna pad and a third antenna pad; a first circuit block having a first and a second contact pad, the first and second antenna pads interconnected to the first and second contact pads respectively. The second circuit block has a third and a fourth contact pads. The second and third antenna pads interconnected to the third and fourth contact pads respectively. The first circuit block may be an RFID integrated circuit and the second circuit block may be an NFC IC.

8 Claims, 14 Drawing Sheets

(56) References Cited

U.S. PATENT DOCUMENTS

| | | | |
|---|---|---|---|
| 7,694,886 B2* | 4/2010 | Tan | G06K 19/07749 |
| | | | 235/487 |
| 10,117,621 B2 | 11/2018 | Berger et al. | |
| 10,342,219 B2 | 7/2019 | Deliou | |
| 11,019,808 B2 | 6/2021 | Deliou | |
| 11,229,361 B2 | 1/2022 | Coen | |
| 2008/0283612 A1* | 11/2008 | Fearn | G06K 7/12 |
| | | | 235/494 |
| 2015/0144702 A1* | 5/2015 | Mei | G06K 19/0775 |
| | | | 235/488 |
| 2016/0275391 A1* | 9/2016 | Sattlegger | G06K 19/07783 |
| 2017/0012355 A1* | 1/2017 | Pachler | H04B 5/26 |
| 2019/0012589 A1* | 1/2019 | Ma | G06K 19/07783 |
| 2019/0289828 A1 | 9/2019 | Deliou | |
| 2020/0226900 A1* | 7/2020 | Ho | G08B 13/2462 |

FOREIGN PATENT DOCUMENTS

| | | | | |
|---|---|---|---|---|
| WO | WO-2009042506 A1 * | 4/2009 | | G06K 19/07749 |
| WO | 2012019239 A1 | 2/2012 | | |
| WO | 2019067473 A1 | 4/2019 | | |

* cited by examiner

IDENTIFICATION TAG, IDENTIFICATION TAG ACCESSORY, AND METHODS AND SYSTEMS FOR USING AN IDENTIFICATION TAG AND IDENTIFICATION TAG ACCESSORY

CROSS-REFERENCE TO RELATED APPLICATIONS

This application is a national phase of Patent Cooperation Treaty (PCT) application No. PCT/CA2021/051705 having an international filing date of Nov. 29, 2021. PCT application No. PCT/CA2021/051705 claims priority to U.S. provisional application No. 63/118,783 filed Nov. 27, 2020. All of the applications referred to in this paragraph are hereby incorporated herein by reference.

TECHNICAL FIELD

The present disclosure relates to identification tags and, more particularly, to an identification tag, an identification tag accessory, and methods and systems for using an identification tag and an identification tag accessory.

BACKGROUND

Tagging pets and other domestic animals with microchips is a common practice in industry. Institutions and professionals that are tasked with caring for unidentified animals such as animal shelters, animal control officers and veterinarians routinely look for tags in the form of microchips to return lost pets quickly to their owners or to track animals generally. Other institutions and professionals who routinely utilize microchip tagging include, but are not limited to, pet owners, breeders, brokers, animal trainers, registries, rescue groups, humane societies, animal clinics, farms, stables, animal clubs and associations, researchers, and pet stores.

In addition to the obvious benefits to these institutions and professionals, the tagging of animals helps avoid potential expenses related to housing, food, medical care, outplacing and euthanasia. Certain jurisdictions around the world even require microchips in imported animals to match vaccination records. In some instances, microchip tagging may be required for regulated international trade in certain endangered species of animals.

Information about the implanted microchip tag is often imprinted on a collar tag worn by an animal, such as a pet. Microchip tags can also be implanted by a veterinarian. Typically, no anesthetic is required and the procedure causes very little discomfort or pain. If a lost pet is wearing the collar tag, an owner can also report a missing pet to a recovery service. As vets or other professionals look for microchip tags in new stray animals and check with the recovery service to see if it has been reported lost or stolen, and to determine pet ownership information.

Pet microchip tags typically use radio frequency identification (RFID) technology. RFID uses radio waves as a medium to transmit information. An RFID tag stores data and, upon being interrogated by a reader, communicates the stored data to a reader or scanner device that interprets it. The RFID tags can be active (powered by a battery) or passive (powered by electromagnetic energy from a reader). Microchip tags utilizing RFID thus offer some degree of traceability.

The use of tags that utilize RFID requires reader equipment for reading the RFID tag, which limits the settings and potential applications associated with such tags. Moreover, RFID is a fairly limited technology that basically allows the reader to simply detect and retrieve information stored in an RFID chip, thus limiting its potential applications.

Accordingly, identification tags that enable a variety of new or improved applications are desired. It is thus an object of the present disclosure to provide improved tags that enable new capabilities.

SUMMARY

Described herein is a tag suitable for use with pets and other animals.

According to an aspect, there is provided an identification tag, comprising: an antenna comprising a core, and a coil surrounding the core, the coil connected to a first antenna pad, a second antenna pad, and a third antenna pad; a first circuit block having a first contact pad and a second contact pad, the first antenna pad and the second antenna pad being connected to the first contact pad and the second contact pad respectively; and a second circuit block having a third contact pad and a fourth contact pad, the second antenna pad and the third antenna pad being connected to the third contact pad and the fourth contact pad respectively.

The identification tag can further comprise a glass housing in which the antenna, the first circuit block, and the second circuit block are enclosed.

The core can include or be ferrite.

The first circuit block can include a near field communication (NFC) integrated circuit (IC) and the second circuit block can include a radio frequency identification (RFID) IC.

The identification tag can further comprise an isolation block positioned to isolate the RFID IC from the NFC IC.

The first circuit block can include a first storage medium storing first identification data, and the second circuit block can include a second storage medium storing second identification data.

The first circuit block and the second circuit block can be provided on a single die.

In another aspect, there is provided an identification tag, comprising: an enclosure, comprising: a first circuit block having a first antenna and a first storage medium storing first identification data; and a second circuit block having a second antenna and a second storage medium storing second identification data, wherein the identification tag provides the first identification data stored in the first storage medium of the first circuit block to a first reader via the first antenna and the second identification data stored in the second storage medium of the second circuit block to a second reader through the second antenna.

The first antenna can be an RFID antenna and the second antenna can be an NFC antenna.

The enclosure can further comprise a bioglass shell.

In a further aspect, there is provided an identification tag, comprising: an enclosure, comprising: an antenna having a first antenna portion and a second antenna portion; a first circuit block connected to the first antenna portion and having a first storage medium storing first identification data; and a second circuit block connected to the second antenna portion and having a second storage medium storing second identification data, wherein the identification tag provides the first identification data stored in the first storage medium of the first block to a first reader via the first antenna portion and the second identification data to a second reader stored in the second storage medium of the second circuit block via the second antenna.

The first reader can be an RFID reader and the second reader can be an NFC reader.

The enclosure can further comprise one of a bioglass shell and a glass shell.

The first circuit block and the second circuit block can be implemented on an integrated circuit chip on the same die.

In still another aspect, there is provided an identification tag, comprising: an antenna comprising a common core having a coil wound around the core, the coil connected to a first antenna pad, a second antenna pad, and a third antenna pad, the first antenna pad and the second antenna pad defining a first antenna portion therebetween, a third antenna pad and one of the first antenna pad and the second antenna pad defining a second antenna portion therebetween; a first circuit block having a first and a second contact pad, the first and second antenna pads connected to the first and second contact pads respectively, the first circuit block having a first storage medium storing first data therein; and a second circuit block having a third and a fourth contact pads, the third antenna pad and the one of the first antenna pad and the second antenna pad connected to the third and fourth contact pads respectively, the second circuit block having a second storage medium storing first data therein.

In a further aspect, there is provided a method for using an identification tag, comprising: receiving, via a first wireless communications interface of an identification tag, first identification data; receiving, via a second wireless communications interface of the identification tag, second data via a second communications interface of the identification tag; and storing the first identification data and the second identification data together in a database.

The method can further comprise authenticating the identification tag via the second identification data.

The method can further comprise accessing a computer system using the first identification data using the second identification data.

The first wireless communications interface can be RFID and the second wireless communications interface can be NFC.

In yet another aspect, there is provided an identification tag accessory, comprising: a first wireless communications interface for receiving first identification data from an identification tag; a second wireless communications interface; a storage medium storing controller-executable instructions and a second identification data; and a controller connected to the first wireless communications interface, the second wireless communications interface, and the storage medium, the controller, when executing the controller-executable instructions: detecting a presence of the identification tag via the first wireless communications interface; receiving the first identification data from the identification tag via the first wireless communications interface; and communicating the second identification data to a computing device in response to receiving the first identification data.

The controller-executable instructions, when executed by the controller, can cause the controller to detect an absence of the identification tag via the first wireless communications interface, and communicate the absence of the identification tag to a computing device.

The controller-executable instructions, when executed by the controller, can cause the controller to authenticate the first identification data received from the identification tag.

The tag accessory can further comprise a fastener for securing the tag accessory on an object or animal, and the controller-executable instructions, when executed by the controller, can cause the controller to detect when the fastener can be secured, and, upon detecting that the fastener is secured, receive the first identification data from the identification tag and communicate the second identification data to the computing device.

The controller-executable instructions, when executed by the controller, can cause the controller to detect when the fastener is opened, and, upon detecting that the fastener is opened, communicate the second identification data and a state of the fastener to the computing device.

The identification tag accessory can further comprise at least one sensor in communication with the controller, and the controller-executable instructions, when executed by the controller, can cause the controller to receive sensor data from the at least one sensor and communicate the sensor data with the second identification data.

The controller-executable instructions, when executed by the controller, can cause the controller to encrypt the sensor data prior to communicating the sensor data with the second identification data.

In still yet another aspect, there is provided an identification tag accessory system, comprising an identification tag accessory as any described above, further comprising a mobile device having a controller and a storage medium storing controller-executable instructions that, when executed by the controller of the mobile device, cause the controller to communicate with the second wireless communications interface of the tag accessory to retrieve the second identification data, and communicate the second identification data to a computer system.

The controller-executable instructions, when executed by the controller of the mobile device, can cause the controller to communicate location data determined by a location module of the mobile device with the second identification data to the computer system.

In still another aspect, there is provided an identification tag system, comprising: an identification tag as any described above; and a computer system having a controller, a communications interface for communicating via a data communications network, and storage media storing a database for relating the second identification data with the first identification data and login credentials associated with the first identification data for a server, and controller-executable instructions that, when executed by the controller, cause the controller to receive the second identification data via the communications interface, retrieve the corresponding first identification data from the database and the corresponding login credentials, and interact with the server using the login credentials and the first identification data.

The received second identification data can be encrypted, and the controller can decrypt the second identification data using a decryption key stored in the database.

The controller, when executing the controller-executable instructions, can authenticate the second identification data received.

The controller can store sensor data received with the second identification data in the data store.

The sensor data received from the identification tag accessory can be encrypted.

The data store can store a list of users and, for each user, permissions regarding data stored in the data store associated with each identification tag.

In a further aspect, there is provided an identification tag system, comprising: an identification tag accessory as any described above; and a computer system having a controller, a communications interface for communicating via a data communications network, and storage media storing a database for relating the second identification data with the first identification data and login credentials associated with the first identification data for a server, and controller-executable instructions that, when executed by the controller, cause the controller to receive the second identification data via the communications interface, retrieve the corresponding first identification data from the database and the corresponding login credentials, and interact with the server using the login credentials and the first identification data.

The received second identification data can be encrypted, and the controller can decrypt the second identification data using a decryption key stored in the database.

The controller, when executing the controller-executable instructions, can authenticate the second identification data received.

The controller can store sensor data received with the second identification data in the data store.

The sensor data received from the identification tag accessory can be encrypted.

The data store can store a list of users and, for each user, permissions regarding data stored in the data store associated with each identification tag.

The controller, when executing the controller-executable instructions, can enable an authenticated user to modify the permissions of other parties for data associated with an identification tag that the authenticated user is a manager.

This summary does not necessarily describe the entire scope of all aspects of the disclosure. Other aspects, features and advantages will be apparent to those of ordinary skill in the art upon review of the following description of specific embodiments.

BRIEF DESCRIPTION OF DRAWINGS

In the accompanying figures, which illustrate by way of example only, one or more embodiments of the present invention.

DETAILED DESCRIPTION

Figure 1:
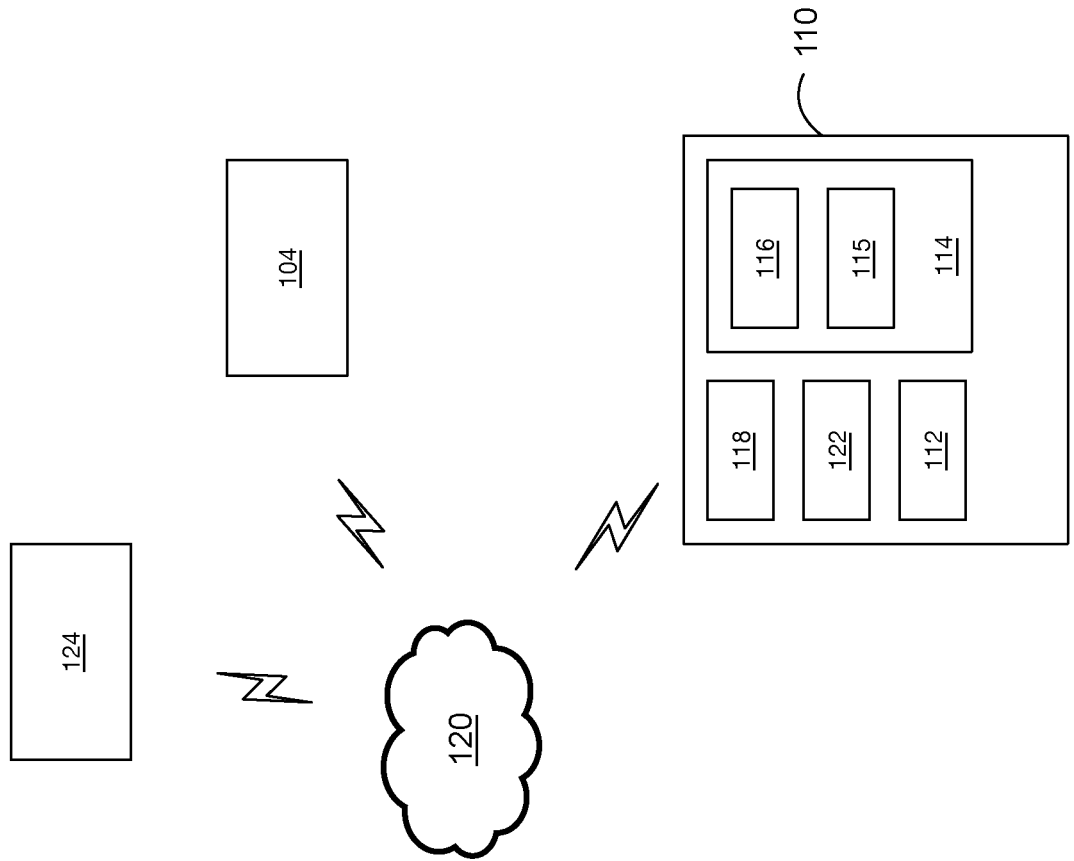
FIG. 1 is a schematic diagram of a pet identification system according to an embodiment, the pet identification system comprising various subsystems including a multipurpose identification (ID) tag, a pet collar, a mobile device, a registration server, a data sharing computer system, and a data communications network.
Figure 1:
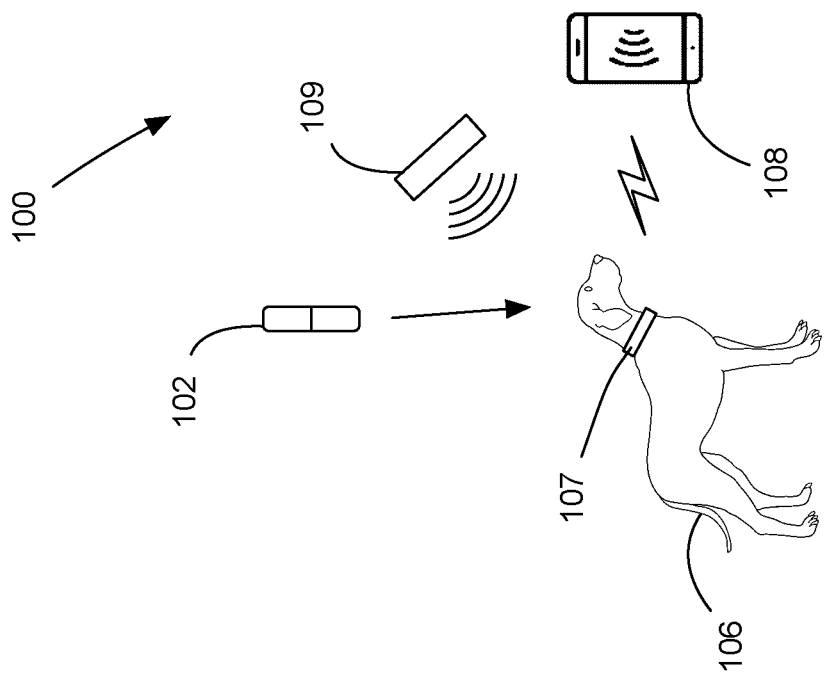

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors. Hereinafter, the term "controller" shall mean processor and/or controller.

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one, for example, two or more, three or more, four or more, and the like.

In this disclosure, the terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method, or use functions. The term "consisting of" when used herein in connection with a composition, use, or method, excludes the presence of additional elements and/or method steps.

In this disclosure, a "blockchain" is a tamper-evident, shared digital ledger that records transactions in a public or private peer-to-peer network of computing devices. The ledger is maintained as a growing sequential chain of cryptographic hash-linked blocks.

In this disclosure, a "node" is a computing device on a blockchain network. The computing device has a controller connected to a controller-readable medium including memory having controller readable instructions thereon.

Over the past decade, and particularly in the last few years, the use of RFID-based tags (alternatively referred to as RFID tags) for identification of pets and other animals has been growing. Some of the end-use applications include authentication of pets, identification of owners of lost pets, limited tracking of the activities of pets, and the like.

RFID-based pet identification tags rely on RFID technology that has been standardized via standards such as ISO 11784 and ISO 11785 as well as ISO 14223. However, the use of RFID technology has been limited to professional settings to ensure security, traceability, and confidentiality. Further, as noted earlier, the use of RFID tags requires specific specialized reader equipment (called an RFID reader) for reading the RFID tag. The use of RFID tags limits the potential uses of pet tags to such professional settings where a reader is readily available. With the recent introduction of wearables for pets, the integration of sensors and flexible connectivity features creates many new opportunities for services, including behavior monitoring, localization, and health monitoring.

As noted earlier, RFID is a fairly limited technology in that an RFID reader simply detects and retrieves information stored in an RFID tag. Other wireless communication standards such as Bluetooth and near-field communication (NFC), on the other hand, offer the possibility of bi-directional communications. These capabilities include card emulation and peer-to-peer (P2P) communications, enabling flexible interaction with smartphones (most of which are now Wi-Fi, Bluetooth, NFC capable) and other mobile devices.

FIG. 1 depicts a simplified schematic diagram of one specific embodiment of a system 100 that is a non-limiting example. The system 100 includes a multipurpose ID tag 102 that can be implantable, and is implanted, in a pet 106. The multipurpose ID tag 102 is equipped to communicate via both RFID and NFC, and provides the hardware link between a pet and the rest of the system 100, enabling associated stakeholders to benefit from reliable pet identification, pet registration, tag authentication, and other related functions. The multipurpose ID tag 102 is implemented in a variety of ways according to the embodiments disclosed herein. As noted above, each implementation aims to combine dual frequencies or technologies to provide a secondary communication technology so that traditional RFID-based operations remain unaffected while the new communication technology enables new capabilities, within the constraints of small physical size for the multipurpose ID tag 102.

In designing a tag having dual communication technologies, RFID and NFC in the currently described embodiment, there is a challenge of reducing interference between RFID and NFC signaling and communication without increasing the size of the tag. At least three different embodiments of a multipurpose ID tag are disclosed herein. In one embodiment, the antennas of the two technologies (e.g., NFC and RFID in this embodiment) are combined while the digital circuits remain separate and external to the antenna. In another embodiment, the same integrated chip (IC) is used having all of the necessary circuits and antenna contained on a single semiconductor die, following the principles of system-on-a-chip (SoC) design. In yet another embodiment, the two technologies are contained within in a unique casing, such as bioglass implant.

Figure 2:
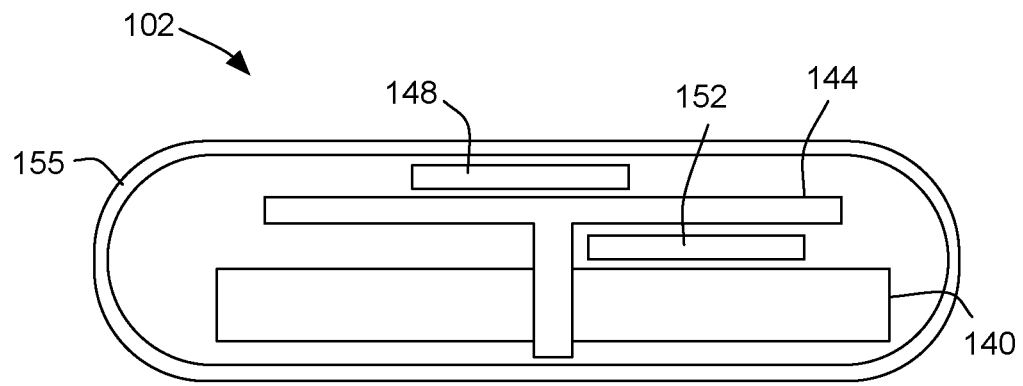
FIG. 2 is a simplified schematic diagram of various components of the multipurpose ID tag of FIG. 1.

Now referring to FIG. 2, the multipurpose ID tag 102 in accordance with the embodiment illustrated in FIG. 1 is shown including a combined antenna 140 that is used to facilitate communication with external RFID and NFC devices. An isolation block 144 in electrical communication with the antenna 140 isolates the parts of the combined antenna 140, as well as other related components from one another. While the isolation block 144 is shown as a physical barrier, it can be provided via electrical insulation or shielding in other embodiments. These related components include an RFID circuit block including an RFID integrated circuit (IC) 152 and an NFC circuit block including an NFC IC 148 that are isolated from one another via the isolation block 144. As the combined antenna 140 is shared for use with both NFC and RFID frequencies, there is a need to reduce the effect and impact of these two technologies on each other's performance. In one particular configuration, the isolation block 144 is implemented as a passive RLC circuit—that is, an electrical circuit consisting of a resistor (R), an inductor (L), and a capacitor (C), to reduce the impact of the NFC IC 148 and the RFID IC 152 on each other. In other configurations, an intermediate node may be involved. In still other configurations, no isolation block is used. Careful management and monitoring can be performed to ensure performance within desired parameters. The combined antenna 140 is equipped with multiple pads, and connected to the isolation block 144 to optimize performance and minimize the interference between both communication technologies. A bioglass shell 155 encloses the combined antenna 140, the NFC IC 148 and the RFID IC 152.

Figure 3A:
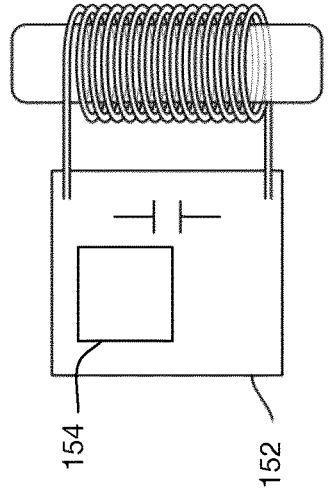
FIGS. 3A, 3B, and 3C depict simplified schematic block diagrams illustrating how individual integrated chips and antennas for NFC and RFID are combined to form a common antenna for the multipurpose ID tag in FIGS. 1 and 2.
Figure 3B:
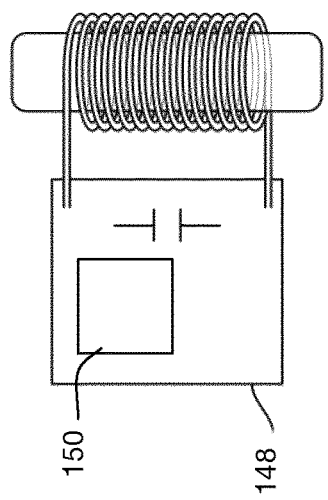
Figure 3C:
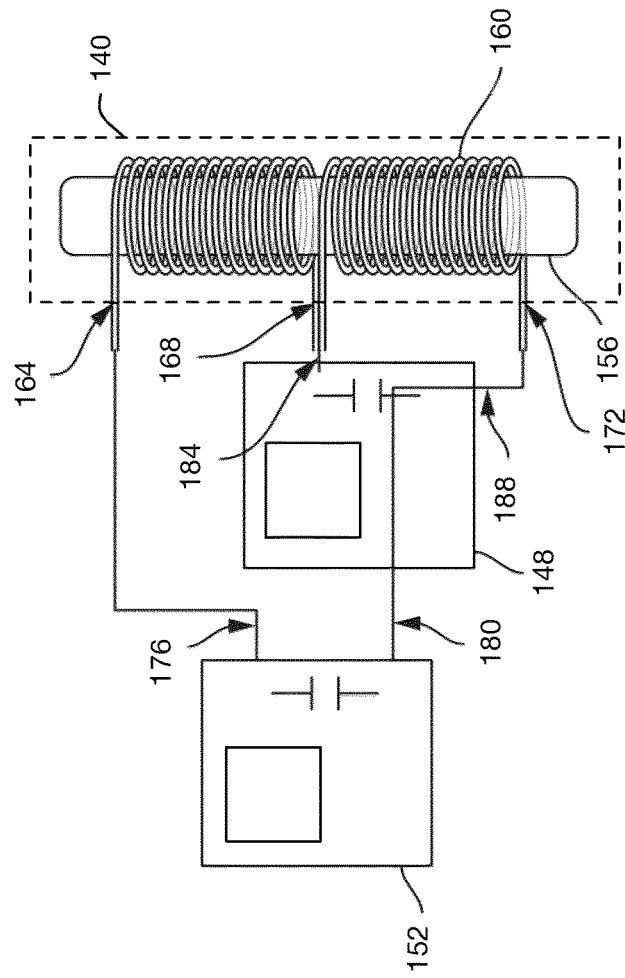

FIG. 3A depicts the RFID circuit block including the RFID IC 152 and the corresponding portion of the combined antenna 140. The RFID IC 152 includes a storage medium 154 that stores identification data in the form of an RFID unique identifier (UID). The RFID UID is stored in a publicly accessible database, as discussed herein below, and can be used to relate the multipurpose ID tag 102 with the pet 106. FIG. 3B depicts the NFC circuit block including the NFC IC 148 and the corresponding portion of the combined antenna 140. The NFC IC 148 includes a storage medium 150 that stores identification data, including a unique identifier (UID), a secret key (sometimes referred to as a secret object), authorization data (such as a universal resource identifier) encrypted by the data sharing computer system 110, and clear (unencrypted) recovery data in NFC Data Exchange Format (NDEF). The secret key is an asymmetric encryption key provisioned to the multipurpose ID tag 102 that is used to authenticate the multipurpose ID tag 102. FIG. 3C shows how the RFID IC 152 and the NFC IC 148 are combined with the common antenna 140 used in this embodiment.

As depicted, the common antenna 140 includes a core 156, a coil 160, a first antenna pad 164, a second antenna pad 168 and a third antenna pad 172. The location of the antenna pads 164, 168, 172 along the coil 160 can be adjusted as later described to tune one or more parameters related to reception, signal strength, and mitigation of interference. While conventional design of NFC antennas often uses a spiraling square antenna on a PCB board, the exemplary common antenna 140 employs a coil 160 on a core 156, which results in a size reduction. A coil design comparatively increases inductance in the circuit while maintaining a small size, which is desirable property in miniaturization of circuits.

The RFID IC 152 has a first pad 176 and a second pad 180 connected to antenna pads 164 and 172. The NFC IC 148 has a first pad 184 and a second pad 188 connected to antenna pads 168 and 172.

The RFID IC 152 may be implemented using the HTSICH56 transponder from NXP semiconductors. The NFC IC 148 may be the SL2S5002 or SL2S5102 semiconductor package from NXP semiconductors. Other integrated circuit packages such as the NTA5332 from the same manufacturer NXP semiconductors can be used for boosting performance.

Referring again to FIG. 1, a tag accessory in the form of a pet collar 107 is secured to the pet 106. The pet collar 107 is in communication with the multipurpose ID tag 102 via NFC communications, however any other suitable wireless communications technology can be employed for communication by and between the multipurpose ID tag 102 and the pet collar 107. The NFC interface of the pet collar 107 is an NFC transceiver as will be detailed below, and is further capable of at least receiving data from the multipurpose ID tag 102 via NFC communications.

Figure 5:
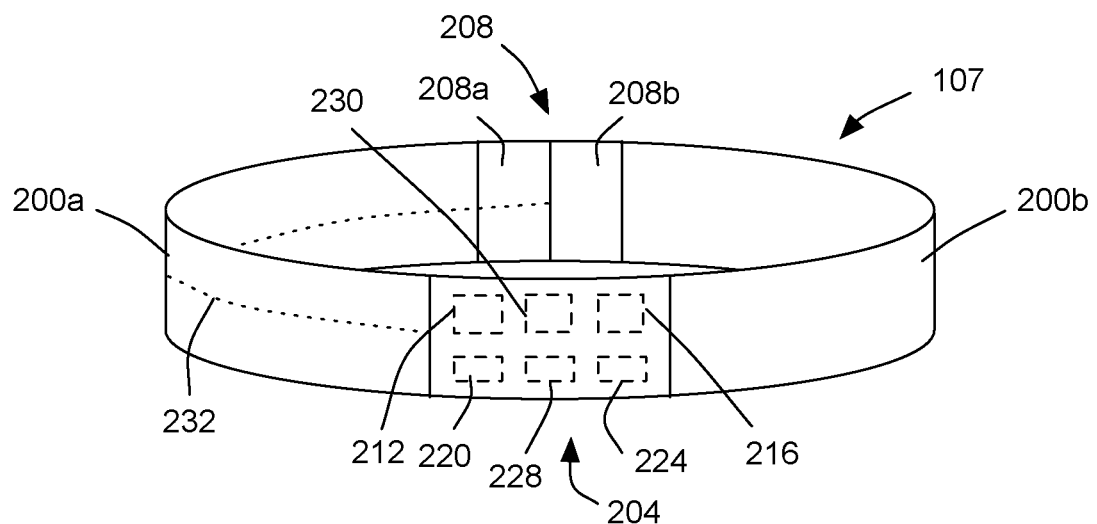
FIG. 5 is a simplified schematic diagram of various components of the pet collar of FIG. 1.

The pet collar 107 is shown in greater detail in FIG. 5, and includes a collar band formed from two collar band portions 200a, 200b extending from a communications module 204. A releasably securable fastener in the form of a clip 208 includes a first clip portion 208a secured to the collar band portion 200a and a second clip portion 208b secured to the collar band portion 200b. The clip portions 208a, 208b enable the distal ends of the collar band portions 200a, 200b to be secured together. The communications module 204 includes an NFC transceiver 212, a Bluetooth transceiver 216, a security module 220, a storage medium 224, a controller 228, and sensors 230. The NFC transceiver 212 is configured to communicate with the multipurpose ID tag 102 via NFC communications, and the Bluetooth transceiver 216 is configured to communicate with a mobile device via Bluetooth communications. The security module 220 is provisioned with a digital certificate during manufacture to authenticate the pet collar 107. In addition, the security module 220 is provisioned with a tag key to decrypt the authorization data stored by the multipurpose ID tag 102, and with a sensor data key to encrypt sensor data generated by the sensors 230. The tag key and the sensor data key are provisioned during pairing of the pet collar 107 with the multipurpose ID tag 102, which generally occurs when the multipurpose ID tag 102 is implanted in the pet 106. The storage medium 224 stores identification data that includes a collar unique identification (UID), as well as controller-executable instructions that can be executed by the controller 228. The controller 228 is in communication with the NFC transceiver 212, the Bluetooth transceiver 216, the security module 220, the storage medium 224, and the sensors 230. Further, the controller 228 is connected to contacts in a first clip portion 208a of the clip 208 by one or more wires 232 to detect when the clip 208 is open or closed. A second clip portion 208b includes corresponding contacts to complete a circuit when the first clip portion 208a is secured to the second clip portion 208b. Other types of fasteners for securing the pet tag accessory to a pet and other types of closure detection systems can be used to detect the open or closed state of the fasteners. The sensors 230 can include a thermometer, an accelerometer, a gyroscope, a global positioning system receiver, skin sensor, blood pressure sensor, heart rate monitor, etc.

Referring again to FIG. 1, an RFID scanner 109 can be used to energize and read the identification data from the multipurpose ID tag 102 via RFID communications. The RFID scanner 109 can be any suitable scanner for at least reading data via RFID communications from the multipurpose ID tag 102. An example of a suitable RFID scanner is a ProScan 700 RFID pet reader.

A mobile device 108 is in communication with the pet collar 107 via Bluetooth communications, but can be any suitable wireless communications technology. The mobile device 108 is a computing device that can be handheld or otherwise mobile. In this embodiment, the mobile device 108 is a smartphone having various communications interfaces, including cellular, Wi-Fi, Bluetooth, and NFC. The NFC interface on the handheld device 108 is capable of reading the multipurpose ID tag 102 on the pet 106 and authenticating it with data sharing computer system 110.

In a preferred implementation, the mobile device 108 is a handheld electronic computing device. Non-limiting examples of handheld electronic devices include a personal digital assistant (PDA), a cellular telephone, a smartphone (e.g. iPhone™, Blackberry™, Windows™ Phone), a media player device (e.g. iPod™), and a device which combines one or more aspects or functions of the foregoing devices. In other embodiments, the devices can be any other suitable electronic devices having a suitable data communications interface to communicate via the data communications network 120. The mobile device 108 is equipped with an application (not shown). As contemplated in this first embodiment, applications communicate with the data sharing computer system 110 via the data communications network 120. In some embodiments, localization can be delivered via the application running on the mobile device 108.

Figure 7:
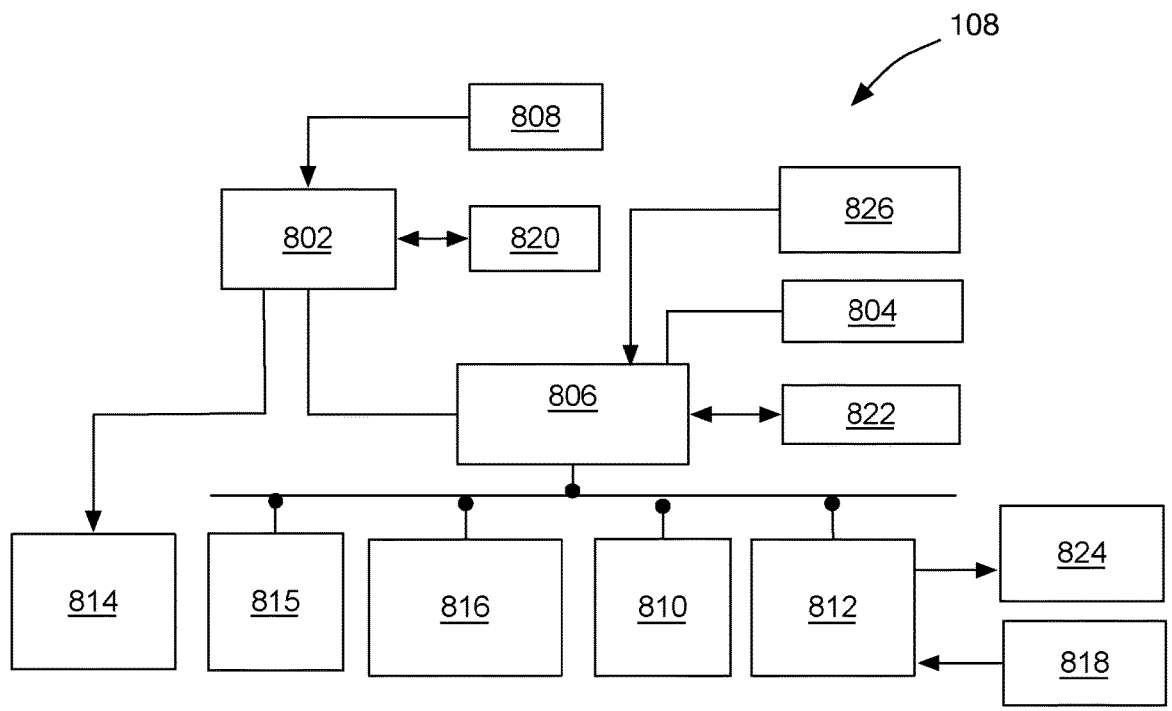
FIG. 7 is a simplified block diagram of various components of the data sharing computer system depicted in FIG. 1.

Referring now to FIG. 7, various components of the mobile device 108 are shown, including a controller 802 such as, but not limited to, a microprocessor, a random access memory (RAM) 804, a touch input 808, a battery 820, and a display 814. The controller 802 communicate with the RAM 804 through an interface circuit 806. Temporarily stored in the RAM 804 are controller-executable instructions that, when executed by the controller 802, cause the controller 802 to provide the functionality of the mobile device 108 described herein. The interface circuit 806 also interconnects with other components including, but not limited to, one or more wireless network interfaces 816, a non-volatile storage 810, an input-output (I/O) interface 822, a camera 826, an audio codec 812, and a location module in the form of a global positioning system (GPS) module 815. The location module can be any type of module for determining the location of the mobile device 108, including via Wi-Fi assist or triangulation, cell tower triangulation, etc. The audio codec 812 in turn connects to one of more microphones 818 and one or more speakers 824. While the storage media of the mobile device 108 includes both the RAM 804 and the non-volatile storage 810 that are described separately, other configurations of storage media can be substituted.

The wireless network interfaces 816 include one or more of an NFC transceiver and a controller, a wireless LAN transceiver (e.g. Wi-Fi™ transceiver), an infrared transceiver, a Bluetooth™ transceiver, and a cellular telephony transceiver. The I/O interface 822 may include one or more wired power and communication interfaces such as a USB port.

The touch input 808 may be a keypad or keyboard, a touch panel, a multi-touch panel, a touch display or multi touch display having a software keyboard or keypad displayed thereon.

Referring again to FIG. 1, as contemplated in this embodiment, the mobile device 108 communicates with a registration server 104 and a data sharing computer system 110 via a data communications network 120. The data communications network 120 can be wired, wireless, or any combination thereof. In a present implementation, the data communications network 120 includes the Internet. In other embodiments, the data communications network can be any other suitable homogeneous or mixed network including, but not limited to, a cellular data network, Wi-Fi™, WiMax™, IEEE 802.16 (WirelessMAN), and any suitable alternative thereof. The suitable data communications interface contemplated in this embodiment between the mobile device 108 and the data communications network 120 is wireless. The interface can be an antenna, transceiver, a network adapter, or a combination thereof.

The registration server 104 is provisioned with the public key of each pet collar 107 during manufacture of the pet collars 107. The public key enables authentication of the pet collar 107.

The data sharing computer system 110 is a computing device that acts as a hub for data sharing in the system 100.

Figure 6:
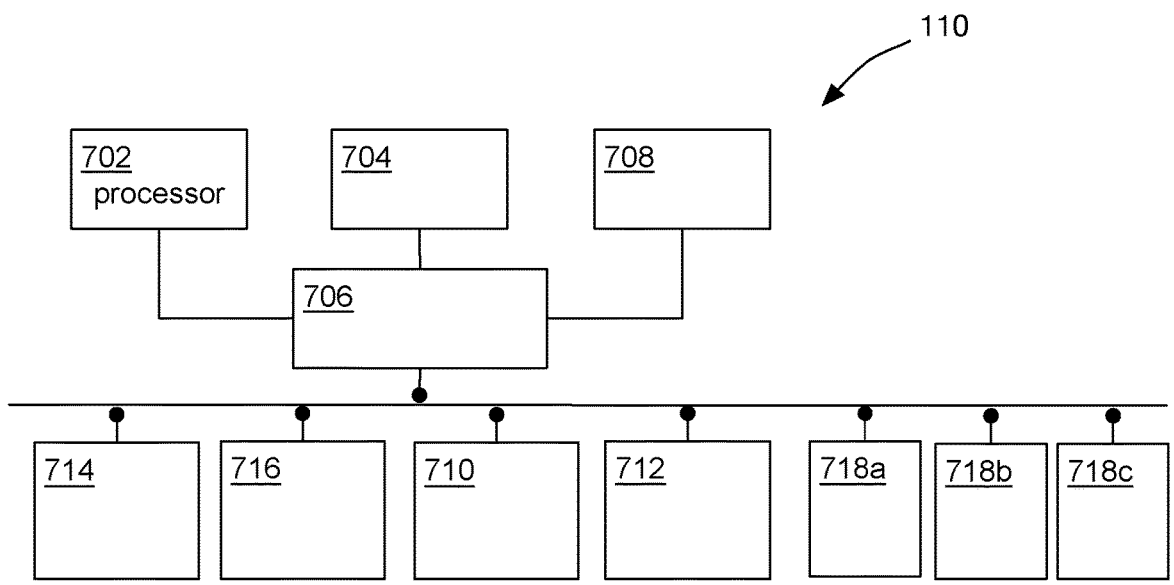
FIG. 6 is a simplified block diagram of various components of the mobile device of FIG. 1.

Referring to FIG. 6, various components of the data sharing computer system 110 are shown, including a controller 702 such as, but not limited to, a microprocessor, a storage medium 704, and interface circuit 706 adapted to provide a means of communication between the controller 702 and the storage medium 704. The interface circuit 706 is also interconnected with input and output (I/O) components such as a display 714, a network adapter 716, a non-volatile storage 710, a printer 712, and one or more additional peripherals 718a to 718c (individually and collectively, peripherals 718). Suitable peripherals 718 include, but are not limited to a keyboard, a camera, a scanner, a touch panel, a joystick, an electronic mouse, touch screen, track-pad, and other input or pointing devices, and any combination thereof. In other embodiments, the interface circuit does not interconnect a printer. In other embodiments, the interface circuit 706 does not interconnect any peripherals. While the storage media of the data sharing computer system 110 includes both the RAM 704 and the non-volatile storage 710 that are described separately, other configurations of storage media can be substituted.

The storage medium 704 may be in the form of volatile memory or a combination of volatile and non-volatile memory, including, but not limited to, dynamic or static random access memory (RAM), read-only memory (ROM), flash memory, solid state memory and the like.

The interface circuit 706 includes a system bus for coupling the various computer components 710, 712, 714, 716, 718 to the controller 702. Suitable interface circuits include, but are not limited to, Industry Standard Architecture (ISA), Micro Channel Architecture (MCA), Extended Industry Standard Architecture (EISA), VESA Local Bus (VLB), Peripheral Component Interconnect (PCI), Peripheral Component Interconnect Extended (PCI-X), Accelerated Graphics Port (AGP), Peripheral Component Interconnect Express (PCIe).

The non-volatile storage 710 can be any suitable storage medium including, but not limited to, a hard disk drive (HDD), a solid state drive (SSD), EEPROM, CD-ROM, DVD, and any other suitable data storage element or medium. The storage medium 710 is readable by the controller 702. Stored in the memory medium 704 are controller-executable instructions that, when executed by the controller 702, cause the controller 702 to provide the functionality of the data sharing computer system 110 described herein.

The display 714 can be any suitable display including, but not limited to, a touch screen.

The network adapter 716 facilitates wired or wireless connections to an Ethernet, Wi-Fi™, Bluetooth™, cellular network or other suitable network, thereby enabling connection to shared or remote drives, one or more networked computer resources, other networked devices, I/O peripherals and the like. The peripheral devices 108 also contain complementary network adapters therein for connecting with a suitable network, and are further equipped with browser or other thin-client or rich-client software. As contemplated in this embodiment, the network adapter 716 comprises a wireless network interface card that allows communication with other computers through a data network such as network 120. In other embodiments, the network adapter does not comprise a wireless network interface card. In other embodiments, the network adapter communicates with the network via a wired connection.

The data sharing computer system 110 executes controller-executable instructions software that provides an authentication service 118, a validation service 122, and many other services (not shown) required on a server class computing device. The authentication service 118 performs functions associated with ensuring that the multipurpose ID tag 102 is an authentic tag issued from a known entity to ensure that the information read by the mobile device 108 is not tampered with or otherwise fake. In addition, the authentication service 118 authenticates the user of the mobile device 108. Once the multipurpose ID tag 102 and the user login credentials received from the mobile device 108 have been authenticated, the validation service 122 enforces policies that determine what permissions the user of the mobile device 108 has. If the user is permitted to access the data associated with the multipurpose ID tag 102, the validation service 122 provides the data associated with the UID of the multipurpose ID tag 102, such as the name of the pet, address of the owner, and the like to the mobile device 108. In this embodiment, the data sharing computer system 110 includes a data store 114 for storing data received from the mobile device 108 and the pet collar 107, and a hardware security module (HSM) 112. The HSM 112 is a computing device that provides cryptographic functions such as safeguarding and managing digital keys, performing encryption and decryption, providing strong authentication, and other cryptographic functions. The HSM 112 may include specialized cryptographic chips to perform these functions more efficiently. Stored by the HSM 112 are an asymmetric key corresponding to the secret key of the multipurpose ID tag 102. A tag key used to encrypt and decrypt the authorization data provisioned to the multipurpose ID tag 102 and a sensor data key used to decrypt the sensor data from the pet collar 107 are also stored by the HSM 112.

The data store 114 provides storage for persistent data in the form of a database 116, such as, but not limited to, data pertaining to pet records, vaccination records, pet travel history, previous owners and the like. Persistent data is often required for applications that reuse saved data across multiple sessions or invocations.

As contemplated in this first embodiment, the data store 114 is used to store data, and includes one or more of a database 116, a blockchain 115, and other storage technologies. The database 116 may be a traditional relational database management system (RDBMS), an object-oriented database management system (OODMS), or the like. The database 116 may be encrypted. Suitable RDBMSes include, but are not limited to, the Oracle server, the Microsoft SQL Server database, the DB2 server, MySQL server, and any alternative type of database such as an object-oriented database server software. In other embodiments, the blockchain 115 can be used to replace or augment the database 116 as will be detailed later.

While the data sharing computer system 110 is illustrated as a single physical computer, the functionality of the data sharing computer system 110 can be provided by two or more computing devices that are locally or globally interconnected.

The RFID scanner 109 as well as an NFC reader, such as is present in the pet collar 107, interact with portions of the same combined antenna 140 to retrieve their respective data via the associated digital circuits, RFID IC 152 and NFC IC 148.

A server 124 that manages one or more services associated with the multipurpose ID tag 102 is also shown in communication with the data communications network 120. The server 124 is one or more computer systems that provide the service or services. In one scenario, the server 124 manages a database of publicly accessible data corresponding to the RFID UID stored by the multipurpose ID tag 102. Using login credentials, data relating to the RFID UID can be updated to reflect a change in ownership of the pet 106, a change in the address of the pet 106, a change in the veterinarian of the pet 106, etc. These login credentials can be stored in the data store 114 of the data sharing computer system 110 so that changes to the data stored by the server 124 can be effected via the data sharing computer system 110.

As noted above, the custom software application includes controller-executable instructions and is installed on a mobile device such as the mobile device 108. The application is executed by the controller 802 of the mobile device 108, and works in conjunction with the operating system of the mobile device 108 to access the storage medium 804 and various hardware components including wireless network interface 816 to exchange data and messages with a plurality of computing devices including other mobile devices 108 and servers.

In some embodiments, the application contains an "Always Found Alert" wherein if someone scans a pet having the multipurpose ID tag, the owner of the pet will be notified via an alert on their application. In other embodiments, a locator feature may be provided. A GPS locator feature will be able to display the coordinates where their pet was last scanned. This may be achieved by using the GPS module on the scanning mobile device along with the information read from the multipurpose ID tag, as will be described below.

In other embodiments, every pet or animal that wears an exemplary embodiment of a pet collar as described herein can interact with other pets having a multipurpose ID tag. Owners who have lost a pet can therefore track their lost animal according to where it was last detected by the application executing on a mobile device. This interaction may take place real time. Ultra wide band (UWB) powered enforcement can be used for UWB can then provide accurate (e.g., centimeter level) tracking of pets when associated to the UWB angle of arrival Bylaw enforcement officers can verify credentials and identify lost animals via mobile device.

Digital records that the application exposes to users by scanning the pet has several advantages. When a vet or customs official scans a pet with a mobile device having the application, the vet will be able to view all relevant and necessary digital identifiers and records which may include but are not limited to: license, ownership, medical history, vaccination records, lineage and the like. Application users will be able to also verify credentials of individuals and organizations to ensure authenticity. Tamper resistant or tamper proof digital records of certifications and other records may be viewable from within the application. Pet owners may carry all necessary digital certifications, health records etc. in the application at all times, without the need to request paper documents. In addition, gamification may be incorporated into the application, to teach and encourage responsible pet ownership. Further, loyalty programs may be incorporated into the application to incentivize desired behavior and reward pet owners.

Figure 8:
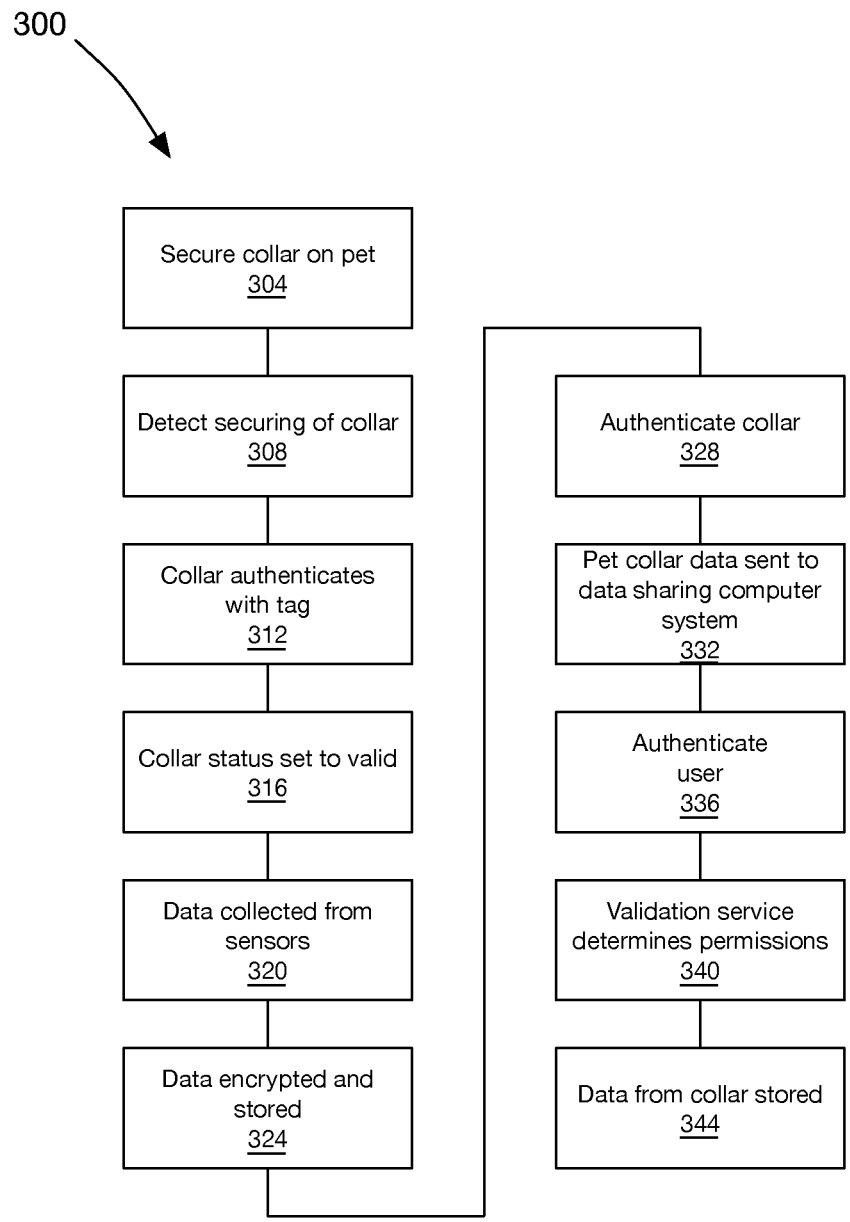
FIG. 8 is a flow chart of the general method of collecting and storing data in the system of FIG. 1.

Now referring to FIG. 8, the general method 300 of collecting and storing data in the system 100 of FIG. 1 is show and commences with the securing of the pet collar 107 on the pet 106 (304). The pet collar is fitted around the neck of the pet 106 and the clip 208 is closed. The controller 228 directs a small voltage to be applied to the wires 232 and monitors the current along the wires 232 to determine when the clip 208 is closed. Upon closure of the clip 208, the controller 228 detects the closure (308). The pet collar 107 then authenticates the multipurpose ID tag 102 (312). During the initial pairing of the pet collar 107 and the multipurpose ID tag 102, the pet collar 107 is provisioned by the data sharing computer system 110 with the key required to decrypt the authentication data stored by the multipurpose ID tag 102. The pet collar 106 queries the multipurpose ID tag 102 and receives an authentication code from the multipurpose ID tag 102 generated using the secret key. The authentication code received from the multipurpose ID tag 102 is authenticated using the secret key stored by the pet collar 107. Upon authenticating with the multipurpose ID tag 102, the status of the pet collar 107 is set to valid (316). That is, when the pet collar 107 is secured on the pet 106, and detects and has authenticated the multipurpose ID tag 102, the pet collar 107 can collect data relating to the pet 106, and it is assumed that the data collected is valid for that pet 106. The sensors 230 then collect data (320). Sensor data can include temperature, blood pressure, heart rate, steps, etc. The data collected is encrypted using the digital certificate and stored in the memory medium 804 of the pet collar 107 (324). In this manner, the collected data stored on the pet collar 107 is not readily accessible to unauthorized parties.

The pet collar 107 is then authenticated (328). When a user of the mobile device 108 opens the application, the application queries the pet collar 107 for authentication data. The pet collar 107 passes its digital certificate to the application executing on the mobile device 108. In turn, the mobile device 108 sends the digital certificate to the registration server 104. The registration server attempts to authenticate the pet collar 107 using the digital certificate, and returns a response of authorized or not authorized. If the pet collar 107 is authorized by the registration server 104, the application sends sensor data from the pet collar 107 to the data sharing computer system 110 (332). The application queries the pet collar 107 for the sensor data, which is encrypted by the pet collar 107, and transmits it to the data sharing computer system 110. In addition, the application sends the time and location data (that is, its geolocation) determined from the GPS module 815 that acts as a proxy for the location of the pet collar 107 and thus pet 106. The user of the mobile device 336 is then authenticated (336). The user of the mobile device 108 enters login credentials the first time the user uses the application. Upon the login credentials being authenticated by the authentication service 118 of the data sharing computer system 110, the mobile device 108 is sent an authentication token that it uses thereafter. In order to add, edit, or read the data in the data sharing computer system 110, the application on the mobile device 108 is authenticated to ensure that an unauthorized party does not upload untrustworthy data. The authentication token is passed to the data sharing computer system 110 with the encrypted sensor data to authenticate the user.

If the authentication service 118 authenticates the user of the mobile device 108 at 336, the user identity is passed to the validation service 122 to determine the permissions of the user (340). The validation service 122 determines the user permissions for the particular pet 106 using the authentication token. In one configuration, the validation service 122 uses policies to determine these permissions. If the user has the appropriate permissions, the data collected by the pet collar 107 is then decrypted and stored in the data store 114 of the data sharing computer system 110 (344). The data can be stored in the database and/or the blockchain.

The system 100 enables the tracking of pets via registration of the location of the multipurpose ID tag 102 and/or the pet collar 107. For example, multiple instances of the application may cooperatively form a network community whereby whenever a lost dog with a multipurpose ID tag and/or pet collar as described herein walks by, any participating mobile device running the application receives a ping or a packet of data that includes the location of the pet and a time stamp. This information is then recorded in a storage on the network (e.g., by the data sharing computer system 110) that records the location and is available to help the owner with locating the missing pet. If the pet collar 107 is removed from the pet 106, the system 100 can help register the last recorded location.

Any mobile device 108 can connect to the multipurpose ID tag and retrieve the recovery data to report the found pet. If the mobile device 108 is within Bluetooth range and has the application installed, the pet collar 107 can send the recovery data via Bluetooth to the application on the mobile device 108. The application, in turn, can then display the recovery data, enabling reporting of the found pet. Also, if the mobile device 108 is within range of NFC communications, the multipurpose ID tag 102 or the pet collar 107 can send an NDEF-formatted message with the recovery data.

Figure 9:
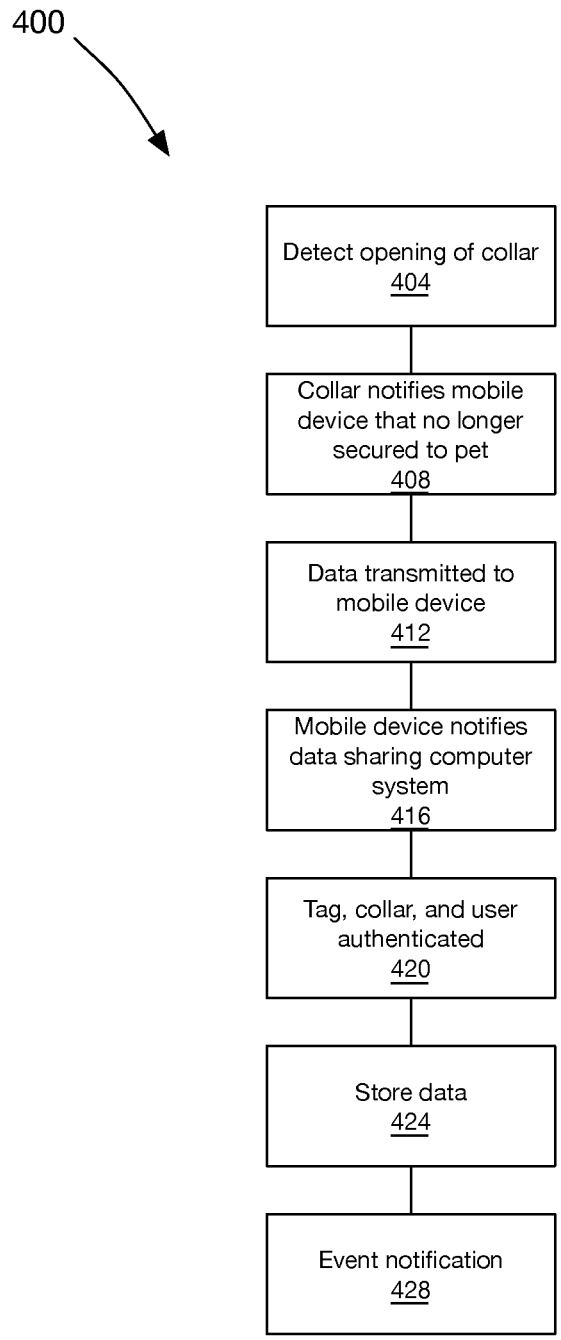
FIG. 9 is a flow chart of the general method of registering removal of the pet collar in the system of FIG. 1.

FIG. 9 shows the general method 400 of registering removal of the pet collar 107 used by the system 100. The method 400 commences with the detection of the opening of the clip 208 (404). When the clip 208 is opened, it is assumed that the pet collar 107 is removed from the pet 106. Upon opening of the clip 208 of the pet collar 107, the controller 228 of the pet collar 107 detects a termination of a current flowing through the wires 232 and determines that the pet collar 107 has been opened and is no longer reliably on the pet 106. The pet collar 107 then notifies the application on the mobile device 108 that the pet collar 107 is no longer secured to the pet 106 (408). This notification is sent via Bluetooth. In addition, the pet collar 107 transmits its UID and any previously untransmitted collected data to the mobile device 108 (412). The UID is in plain text and the previously untransmitted collected data is encrypted using the sensor data key so that the data sharing computer system 110 can authenticate the communicated data. Upon being notified of the removal of the pet collar 107 from the pet 106, the application on the mobile device 108 transmits a notification of the event, the UID of the pet collar 107, the encrypted sensor data received from the pet collar 107, and the application's authentication token to the data sharing computer system 110 (416). In addition, the application sends the time and the current location information received from the GPS module 815. This time and location serves as the last confirmed time and location of the pet collar 107 and thus the pet 106.

The pet collar 107 and the user's authentication token are then authenticated (420). The authentication service 118 of the data sharing computer system 110 authenticates the application's authentication token and the pet collar 107 using the UID passed and the corresponding sensor data key it has stored in the HSM 112. Upon authenticating the pet collar 107 and the application's authentication token, the data for the event is stored in the data store 114 (424). The event data, together with the time and location data, and the decrypted sensor data, are stored in the data store 114. The data sharing computer system 110 then sends a notification of the collar opening to one or more interested parties registered for the pet collar 107. That is, while it may not be the pet owner that is proximal to the pet when the pet collar 107 is removed and the event is registered, the pet owner can be notified that the pet collar 107 has been removed, where, and when.

In an alternative embodiment, removal of the pet collar 107 from the pet can be determined by detecting an absence of the multipurpose ID tag 102 (that is, no longer detecting a presence of the multipurpose ID tag 102), via a skin sensor, or another suitable sensor.

As the data is collected from the pet collar 107 and the mobile device 108, the data registered by the data sharing computer system 110 can be shared with third parties, assuming that the user has the appropriate permissions.

Figure 10:
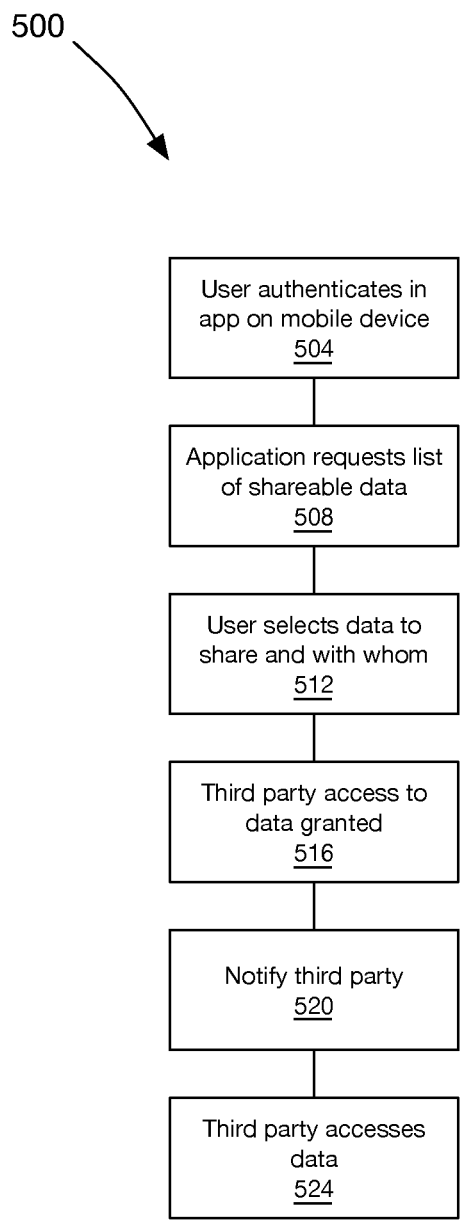
FIG. 10 is a flow chart of the general method of sharing data with third parties using the data sharing computer system of FIG. 1.

FIG. 10 shows the general method 500 of sharing data using the system 100. In order to share data, a user authenticates (logs in) in the application on the mobile device 108 (504). The login credentials are sent to the data sharing computer system 110 and are authenticated by the authentication service 118, which generates an authentication token and sends it back to the mobile device 108. Upon authenticating, the application requests a list of shareable data from the data sharing computer system 110 (508). The data sharing computer system 110 uses the authentication token passed with the request by the mobile device 108 to determine the data for which the user has sharing permissions and sends a list back to the mobile device 108. The user then selects the data that is to be shared and the third party with which to share the data (512). The data sharing computer system 110 then registers the permissions granted to the third party for the particular data (such as the data for a particular pet). The data sharing computer system 110 then notifies the third party of the new data access permissions (520). This can be done in any sort of suitable manner, such as via an email, an in-app notification, etc. The third party can then access the data through the data sharing computer system (524).

Figure 11:
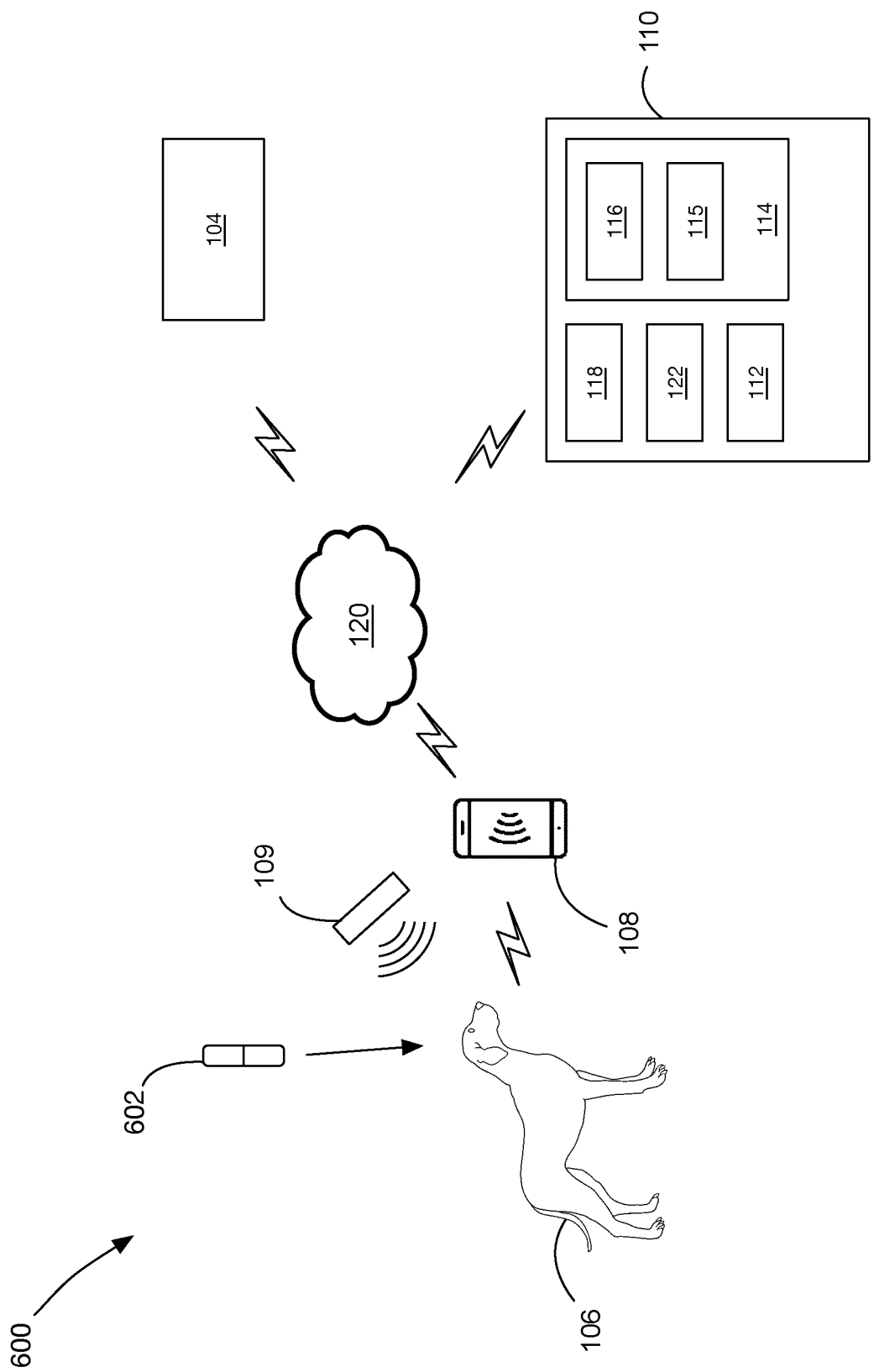
FIG. 11 is a schematic diagram of a pet identification system according to another embodiment similar to that of FIG. 1, wherein the mobile device directly communicates with the multipurpose ID tag.

FIG. 11 shows a system 600 that is similar to the system of FIG. 1 except that a pet collar is not employed. Instead, the mobile device 108 communicates directly with a multipurpose ID tag 602 via NFC. The multipurpose ID tag 602 is the same as or very similar to the multipurpose ID tag 102 of the system 100 of FIG. 1. As will be appreciated, due to the range of RFID communications, the mobile device 108 would likely need to be held closer to the pet 106 than would otherwise be required where the pet collar 107 is used.

In operation, the application, when executed on a suitable mobile device, allows interaction with a multipurpose ID tag 102 implanted in any pet. A mobile device with the application will be able to communicate with the multipurpose ID tag 102 directly without hardware that is not typically found in such mobile devices, which empowers anyone to identify any animal or at least determine how to report the pet as found and identify the pet in a manner that will be understood by the registrar of pets or another authorized party.

Figure 12:
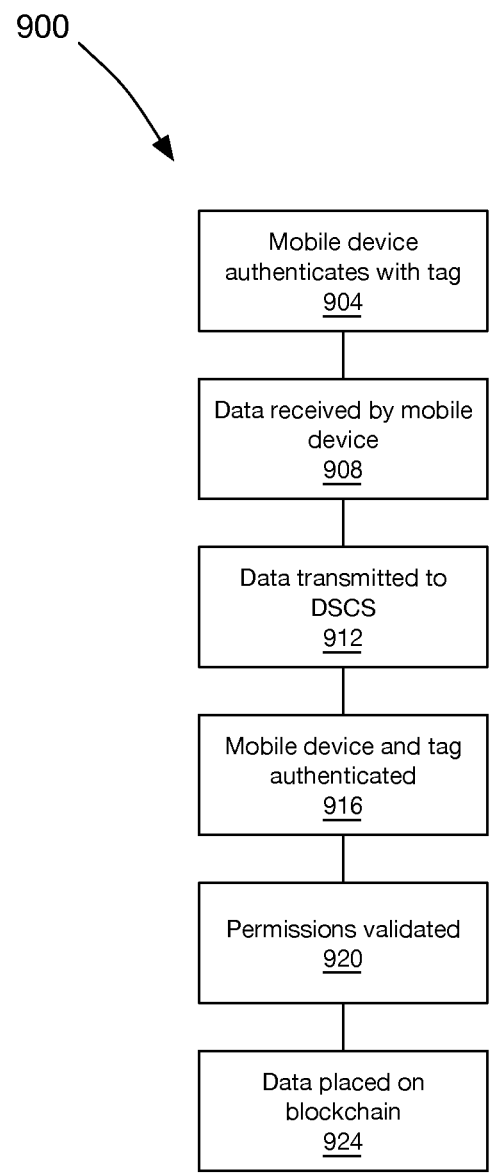
FIG. 12 is a flow chart of the general method of collecting and storing data in the system of FIG. 11.

FIG. 12 shows the general method 900 of collecting and storing data in the system of FIG. 11. The method 900 commences with the mobile device 108 authenticating with the multipurpose ID tag 602 (904). The mobile device 108, when the application is being paired with the multipurpose ID tag 602, receives the UID and the key required to decrypt the authentication data stored by the multipurpose ID tag 102 that it then uses thereafter to authenticate the multipurpose ID tag 602. Upon authenticating with the multipurpose ID tag 602, the multipurpose ID tag 602 provides at least its previously untransferred data to the mobile device 108 (908). Any data that the multipurpose ID tag 602 has collected since last transmitting data to the mobile device 108 is transmitted to the mobile device 108. This data can include any log data captured by the multipurpose ID tag 602. The mobile device 108 then transmits the previously untransferred data from the multipurpose ID tag 602 to the data sharing computer system 110 together with the authentication token previously received from the data sharing computer system 110 (912). The mobile device 108 can also share the time and the location of the mobile device 108 as a proxy for the location of the multipurpose ID tag 602. Upon receiving the data, the authentication service 118 authenticates the authentication toke of the mobile device 108 and the multipurpose ID tag 602 (916). Once authenticated, the validation service 122 determines what permissions the user associated with the authentication token has with respect to the multipurpose ID tag 602 (924). If the user has permission to submit data from the multipurpose ID tag 602, then the data sharing computer system 110 stores the received data in the data store 114 (928).

Figure 13:
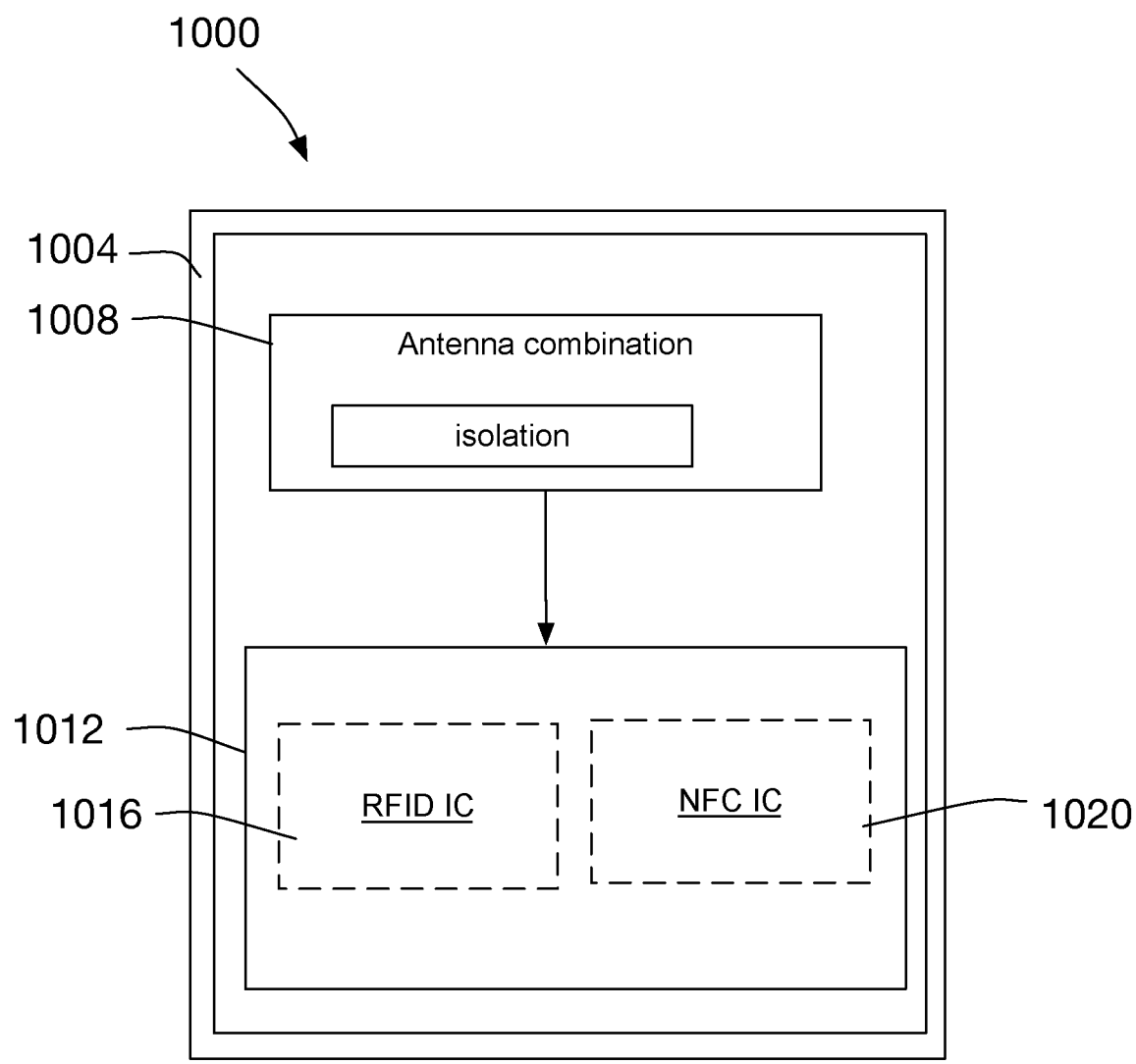
FIG. 13 is a simplified schematic block diagram of components of a multipurpose ID tag in accordance with yet another embodiment that employs dual technologies on a single semiconductor die package.

FIG. 13 shows a multipurpose ID tag 1000 employing a system-on-a-chip design in accordance with another embodiment, wherein a physical combination of dual technology (RFID and NFC) is implemented inside the same integrated chip on the same silicon or other semiconductor die. The general principles of combining two physical circuits previously configured on separate IC packages on a single chip are known. Many systems-on-a-chip (SoCs) operate on the same principle. Other factors remaining the same, integrating separate circuits onto the same die typically leads to lower cost, smaller footprint on a circuit board and better performance. However, combining circuits on the same SoC requires a new integrated circuit design and a new silicon die.

NFC is a specialized subset within the family of RFID technologies. The combination of NFC and RFID technologies therefore requires careful interference management so as to reduce the impact on performance utilizing a shared frequency. Due to size constraints, physical proximity of antennas and other components cannot be avoided. In the depicted embodiment, the frequency range used is the low frequency (LF) RFID range of 125 KHz to 134.2 KHz. The multipurpose ID tag 1000 has a glass or bioglass shell 1004 enclosing a common antenna 1008 connected to a single physical integrated chip (IC) 1012. Internally, the same physical IC 1012 has individual implementations of an RFID IC 1016 and a NFC IC 1020.

When the dual technology (e.g. RFID and NFC) is combined inside the same integrated chip (IC), the circuit and firmware associated with the two technologies, including their analog antenna design is implemented on the same piece of silicon die.

Figure 14:
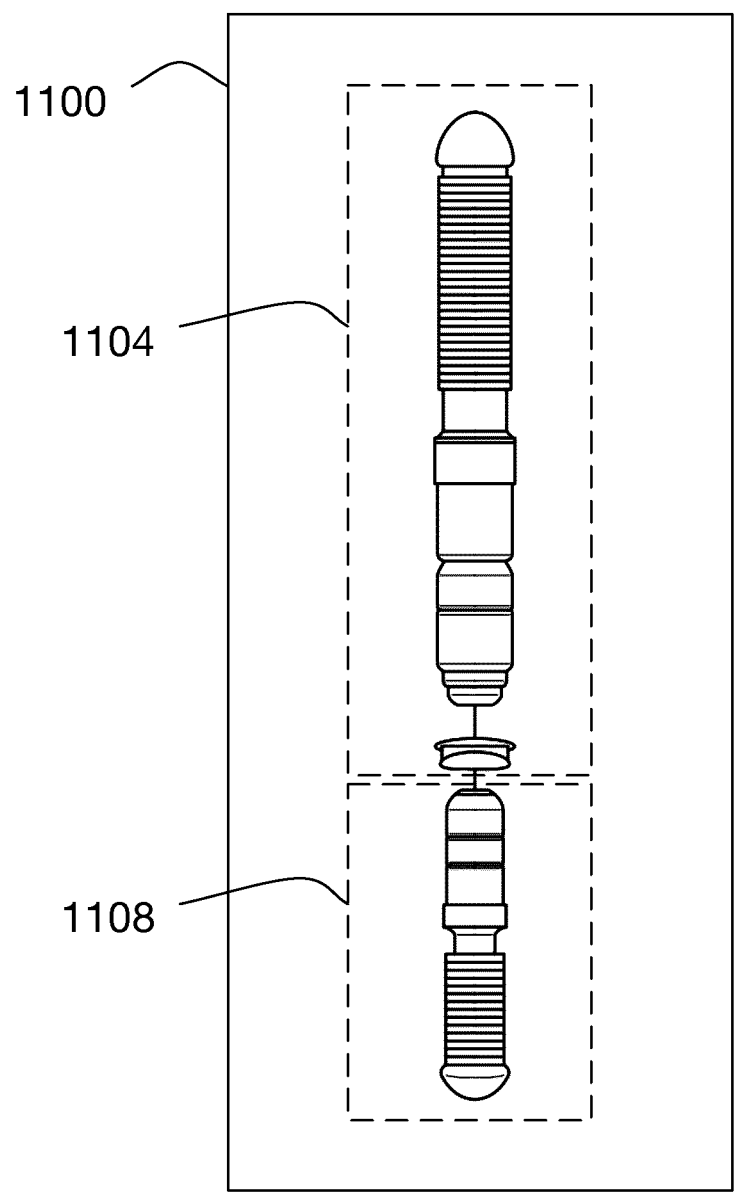
FIG. 14 is a simplified schematic block diagram of various components of a multipurpose ID tag according to another embodiment and having an integrated chip and antenna for each technology within a bioglass.

In another embodiment, the solution for a physical combination of dual communication technologies (RFID and NFC) may be provided by combining two physical circuits in a unique casing, such as a bioglass implant. As shown in FIG. 14, two components 1104 and 1108 corresponding to the two technologies (e.g., RFID and NFC) are coupled together to form a multipurpose ID tag 1100, each with its own separate antenna and separate IC may be used for each technology.

Figure 15:
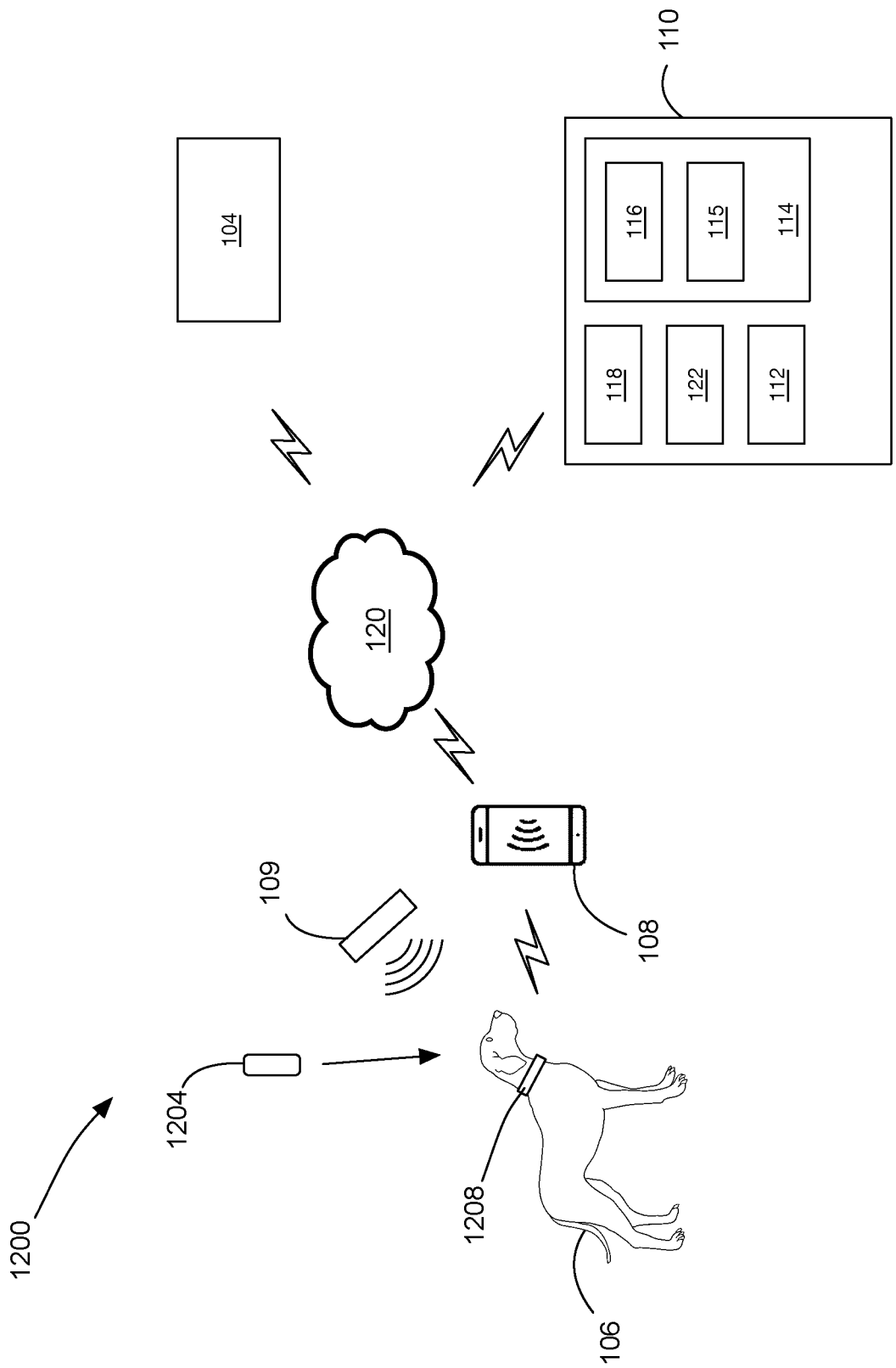
FIG. 15 is a schematic diagram of a pet identification system according to an embodiment, wherein a pet collar includes an RFID reader for reading a conventional microchip ID tag.

FIG. 15 shows a system 1200 in accordance with yet another embodiment that is similar to that of FIG. 1, wherein a conventional ID tag 1204 is implanted in a pet 106. A pet collar 1208 includes an RFID reader for reading identification data from the conventional ID tag 1204, and a Bluetooth or other suitable wireless communication standard transceiver for communicating the identification data to a mobile device 108.

Figure 16:
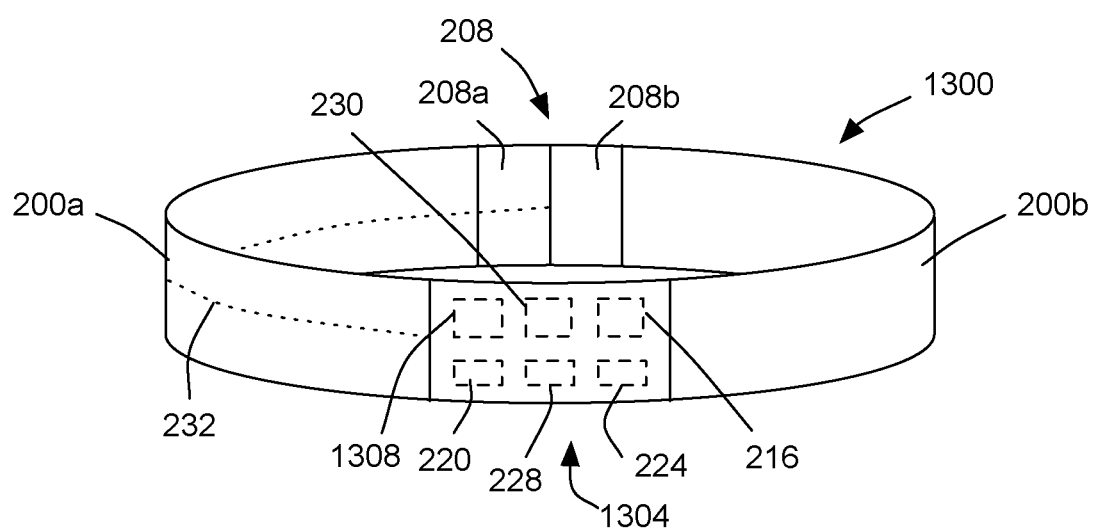
FIG. 16 is a simplified schematic diagram of various components of the pet collar of FIG. 15.

FIG. 16 shows the pet collar 1208 in greater detail. Elements very similar to or the same as the corresponding component in the pet collar 107 shown in FIG. 5 are numbered accordingly and are not described again. Instead of including an NFC transceiver, the communications module 1304 of the pet collar 1208 includes an RFID reader 1308 that is configured to read data from the conventional RFID-based ID tag 1204.

In alternate embodiments, a subset of the data store may be implemented as part of wider system employing blockchain technology. Specifically, a blockchain and optionally a relational database and other data management solutions can be used.

Blockchain transactions work via consensus. Blockchain technology maintains a reliable record of transactions by means of collective participation and consensus among participants. Blockchain has often been understood and described as a distributed ledger technology (DLT), jointly maintained by multiple networked devices called nodes. Blockchain can thus be thought of as a distributed database system. The records are tamper-evident, accessible to application participants, and cannot be changed without consensus which helps build trust and confidence.

Both public and private blockchains are decentralized peer-to-peer networks, where each participant or node maintains a replica of a shared append-only ledger of digitally signed transactions; and provide certain guarantees on the immutability of the ledger, even when some participants are faulty or malicious.

A private blockchain is generally a permissioned network so that there are restrictions on who is allowed to participate in the network, and what type of transactions. Participants need to obtain an invitation or permission to join. The access control mechanism may vary so that existing participants could decide future entrants; a regulatory authority or the owner or administrator of the blockchain may issue licenses for participation; or a consortium could make the decisions. Once an entity has joined the network, the entrant will play a role in maintaining the blockchain in a decentralized manner.

Information such as medical records, breed information, certifications, ownership information on a private blockchain that would be accessible to trusted stakeholders. This will facilitate trust, transparency, accuracy and improve efficiency across borders and between stakeholders.

Current microchip databases operate individual siloed databases and include simple relational data models such as pet chip number, owner name and contact address. The database operator is under no obligation to disclose its data or operation. Using the multipurpose ID tag and/or pet collar described above can enable a central system for aggregation and management of all data related to the pet.

The owner of a pet can establish a geofence for the location of the pet so that an alert is generated and delivered to the owner when the pet is detected in a location outside the geofence.

In the depicted embodiment in FIG. 1, the blockchain 115 can be a private blockchain with permissions to create a data store that can be accessed by key stakeholders such as government, vets, shelters and breeders. While an authority may administer and maintain the ledger in blockchain 115, all parties will have access to the data and assume responsibility for entering accurate information and keeping records current. Storing important information such as lineage, medical history, license, ownership, travel history on a private blockchain has several benefits including immutability, privacy, security and transparency.

Linking the information stored in the database directly to a microchip ensures that such critical data follows the animal for the entirety of its life rather than depending on a wearable device.

The blockchain 115 may thus provide a detailed and trusted animal identification that encompasses all aspects of a pet's life. For example, when an animal needs to cross a border, a customs official can scan the animal's multipurpose ID tag with a mobile device and know with certainty that the records and documents were inputted directly from trusted parties to facilitate safer and more efficient travel.

Figure 4A:
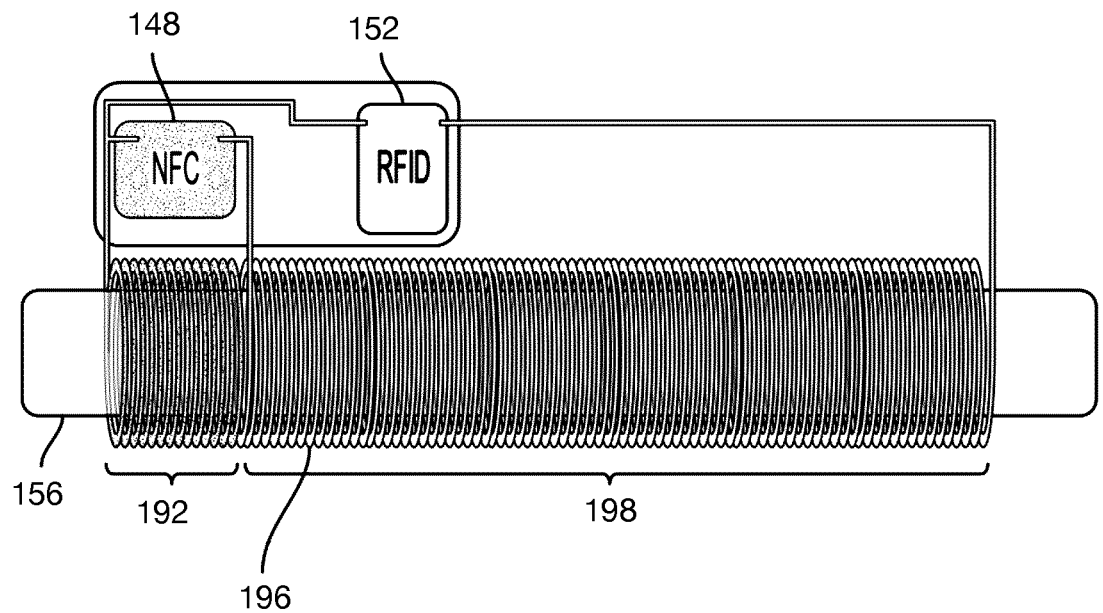
FIGS. 4A and 4B depict two alterative variants of the common antenna of FIG. 3C formed by varying the location at which antenna pads are formed.
Figure 4B:
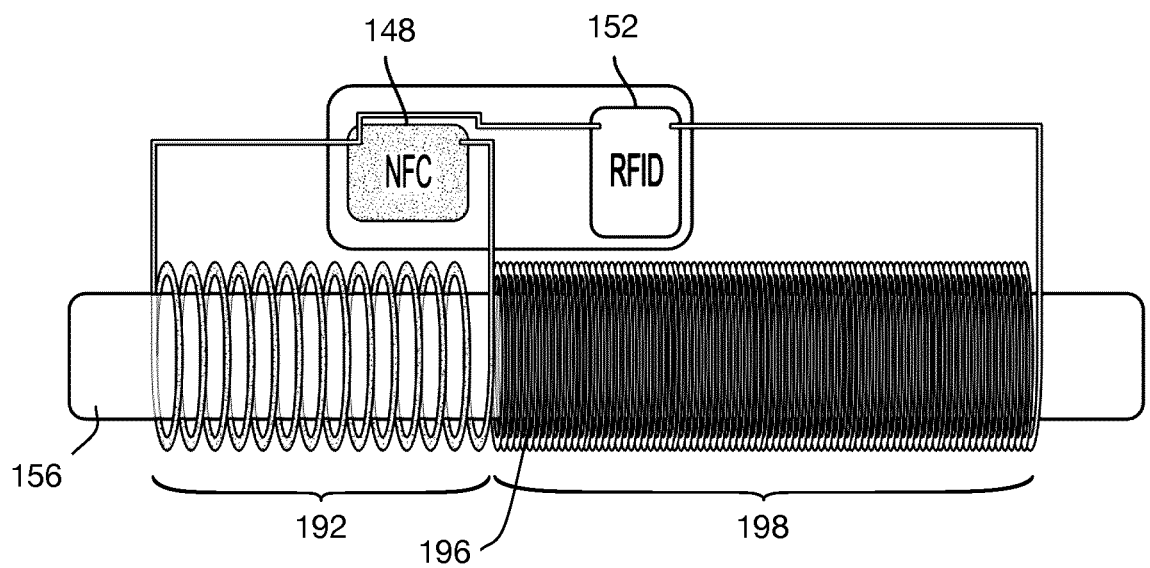

FIGS. 4A and 4B depict two alterative implementations of the common antenna 140 design providing both RFID and NFD portions by varying the location at which pads are formed.

As shown in FIG. 4A, antenna 140 has core 156 with the coil 160 wound around the core 156. The coil 160 is made up electrically conductive material and is apportioned into a first NFC portion 192 and a second RFID portion 196 implemented on the same antenna 140. The antenna pads are formed along the core 156. The core 156 in this embodiment is a ferrite core. In FIG. 4A, the NFC portion 192 is shorter than its counterpart in the embodiment of FIG. 4B. Consequently RFID portion 196 is longer FIG. 4A that its counterpart in the embodiment of FIG. 4B. In the implementations shown in both FIGS. 4A and 4B, the components are encased in a shell 197 of bioglass or another suitable material.

The arrangement of the pads, particularly the common pad, along length of the coil is used to apportion the antenna between the first NFC portion 192 and a second RFID portion 198.

In addition to the lengths of the portions 192, 198, the winding turns of the coil 160 may be different (denser or more sparse) so that more or less turns are accommodated per unit length in the individual portions. As depicted, RFID which uses a lower frequency (f), requires higher inductance and thus a higher number of turns than NFC. Accordingly, a greater proportion of the antenna will be used for RFID signals.

Many other applications are possible with tags exemplary of the present disclosure. Some pet doors can be programmed to be activated by the microchips of specific animals, allowing only certain animals to use the door.

The demonstrated miniaturization of circuits with dual technologies (NFC and RFID, and/or others) enables incorporation of sensors and battery boosting inventions. Other applications involving—booting the tag signal (e.g., nano-batteries) can be implemented. Temperature sensors that operated via external NFC field on collar or other accessories are also possible.

It is contemplated that any part of any aspect or embodiment discussed in this specification may be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

Unless defined otherwise, all technical and scientific terms used herein have the same meaning as is commonly understood by one of ordinary skill in the art to which this invention belongs. In addition, any citation of references herein is not to be construed nor considered as an admission that such references are prior art to the present invention.

The scope of the claims should not be limited by the example embodiments set forth herein, but should be given the broadest interpretation consistent with the description as a whole.

What is claimed is:

1. An identification tag, comprising:
   an antenna comprising a common core having a coil wound around the core, the coil connected to a first antenna pad, a second antenna pad, and a third antenna pad, the first antenna pad and the second antenna pad defining a first antenna portion therebetween, the third antenna pad and one of the first antenna pad and the second antenna pad defining a second antenna portion therebetween;
   a first circuit block having a first contact pad and a second contact pad, the first antenna pad and the second antenna pad being connected to the first contact pad and the second contact pad respectively, the first circuit block having a first storage medium storing first data therein; and
   a second circuit block having a third contact pad and a fourth contact pad, the third antenna pad and the one of the first antenna pad and the second antenna pad connected to the third contact pad and the fourth contact pad respectively, the second circuit block having a second storage medium storing first data therein.

2. The identification tag of claim 1, further comprising a glass housing in which the antenna, the first circuit block, and the second circuit block are enclosed.

3. The identification tag of claim 1, wherein the core comprises ferrite.

4. The identification tag of claim 3, wherein the core is a ferrite core.

5. The identification tag of claim 1, wherein the first circuit block includes a near field communication (NFC) integrated circuit (IC) and the second circuit block includes a radio frequency identification (RFID) IC.

6. The identification tag of claim 1, further comprising an isolation block positioned to isolate the RFID IC from the NFC IC.

7. The identification tag of claim 6, wherein the first circuit block includes a first storage medium storing first identification data, and wherein the second circuit block includes a second storage medium storing second identification data.

8. The identification tag of claim 1, wherein the first circuit block and the second circuit block are provided on a single die.

* * * * *